(12) United States Patent
Dettorre et al.

(10) Patent No.: US 11,992,977 B2
(45) Date of Patent: May 28, 2024

(54) METHOD AND DEVICE FOR CLEANING A VULCANIZATION MOLD

(71) Applicant: COMPAGNIE GENERALE DES ETABLISSEMENTS MICHELIN, Clermont-Ferrand (FR)

(72) Inventors: Jean-Marie Dettorre, Clermont-Ferrand (FR); Quentin Deniau, Clermont-Ferrand (FR); Frederic Drago, Clermont-Ferrand (FR); Michel Druet, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 1021 days.

(21) Appl. No.: 16/772,412

(22) PCT Filed: Dec. 13, 2018

(86) PCT No.: PCT/FR2018/053245
§ 371 (c)(1),
(2) Date: Jun. 12, 2020

(87) PCT Pub. No.: WO2019/115947
PCT Pub. Date: Jun. 20, 2019

(65) Prior Publication Data
US 2021/0078211 A1    Mar. 18, 2021

(30) Foreign Application Priority Data
Dec. 14, 2017   (FR) ..................... 17 62145

(51) Int. Cl.
*B29C 33/72*     (2006.01)
*B25J 9/16*      (2006.01)
(Continued)

(52) U.S. Cl.
CPC ............. *B29C 33/72* (2013.01); *B25J 9/1664* (2013.01); *B25J 11/0085* (2013.01); *B29D 30/0662* (2013.01); *B29D 2030/0663* (2013.01)

(58) Field of Classification Search
None
See application file for complete search history.

(56) References Cited

U.S. PATENT DOCUMENTS 8,437,875 B2 *  5/2013  Hernandez ........... G05D 1/0221
                                                 15/321
9,669,548 B2    6/2017  Tanabe et al.
(Continued)

FOREIGN PATENT DOCUMENTS

CN   104941851   *  9/2015 ............ B05B 13/04
DE   19830397 A1    1/2000
(Continued)

OTHER PUBLICATIONS

DE19830397 English translation, accessed on Jul. 2023. (Year: 2000).*

(Continued)

*Primary Examiner* — Eric W Golightly
*Assistant Examiner* — Arlyn I Rivera-Cordero
(74) *Attorney, Agent, or Firm* — VENABLE LLP (57) ABSTRACT

A method for cleaning a vulcanization mold for tires in a curing press uses device having a collaborative mobile robot and incorporating a computer program. The robot includes an autonomous mobile platform mounted on drive wheels and having batteries supplying electricity, a dry ice dispenser, sensors for identifying the location of the mold to be cleaned, and motors ensuring its displacement between a storage location of the device and the mold to be cleaned and the displacement of an articulated mobile arm of the robot. The robot bears a nozzle for spraying dry ice from the dispenser. The device comprises means for communication with a control unit. The control unit sends a mission instruction to the device, which navigates between a storage location and the location of the mold and automatically cleans the vulcanization mold.

17 Claims, 5 Drawing Sheets

(51) Int. Cl.
*B25J 11/00* (2006.01)
*B29D 30/06* (2006.01)

(56) References Cited

U.S. PATENT DOCUMENTS

2010/0312390 A1  12/2010  Dupourque
2017/0348879 A1  12/2017  Yuzer et al.

FOREIGN PATENT DOCUMENTS

EP      2695728 A1     2/2014
FR    2 916 152 A1    11/2008
WO  2016/105308 A1    6/2016

OTHER PUBLICATIONS

FR2916152 English translation, accessed on Jul. 2023. (Year: 2008).*
CN104941851 English translation, accessed on Jul. 2023. (Year: 2015).*
International Search Report dated Feb. 13, 2019, in corresponding PCT/FR2018/053245 (4 pages).

* cited by examiner

METHOD AND DEVICE FOR CLEANING A VULCANIZATION MOLD

CROSS-REFERENCE TO RELATED APPLICATIONS

The present application is a 35 U.S.C. § 371 National Stage patent application of International patent application PCT/FR2018/053245, filed on Dec. 13, 2018, which claims priority to French Application No. 1762145, filed on Dec. 14, 2017.

BACKGROUND

The present invention relates to the field of the curing of tyres and deals more particularly with cleaning of the moulds used in the vulcanization of the tyres.

Tyres are usually obtained by moulding and vulcanization of a raw jacket inside a mould installed in a curing press. The vulcanization mould generally comprises segments which form, after vulcanization, the radially outer surface or tread of the tyre and shells arranged axially on either side of the segments and forming the side walls of the tyre. During the moulding, the outer walls of the jacket are pressed against the metal inner walls of the curing mould by means of a curing membrane which is, for its part, expandable under the effect of a heat transfer fluid under pressure. The design of the tread from the linings of the mould and that of the shells is then imprinted on the raw jacket, which is then vulcanized using heat.

The segments and the shells are metal and are generally obtained by casting and mechanical machining techniques and sometimes include a coating layer. The patterns of the segments are often complex and the segments can include venting orifices. After having performed a certain number of mouldings, the mould must be cleaned to remove the moulding residues, for example the rubber, the oil and the grease which stick to the moulding parts and block the venting orifices.

Various techniques are known for cleaning the vulcanization moulds, notably sandblasting, but that does not allow for a good cleaning of all the nooks and crannies of the segments, moreover, the sand is highly abrasive and can damage the moulding surface and detaches the coating from the latter when present. In addition, the sand used for the cleaning has to be dispelled.

Also known is another technique for cleaning moulds using a laser ray device, but which takes a long time and requires simultaneous suction of the fumes and residues. In addition to its significant bulk (its generator takes a lot of space and is not suited to cleaning a mould in the curing press), such a laser ray device can prove dangerous for the user.

Another cleaning technique which gives very good results is cleaning using dry ice under pressure. Thus, particles of dry ice are sprayed at high speed against the walls of the mould, the ice is sublimated on contact with the hot walls of the mould and instantaneously unsticks the residues which are driven by the gases which result therefrom or are discharged subsequently. In operation, an operator provided with a dry ice gun comes as close as possible to a curing press and actuates the gun manually to the interior of the mould. The dry ice sprayed into the mould does a good job of cleaning it, but in working conditions that are fairly tough for the operator, notably in terms of noise (the noise generated by the cleaning operation reaches sound intensities of approximately 100 to 120 dB), of danger linked to the temperature of the mould, of low visibility inside the mould to be cleaned and, ultimately, of fatigue.

The document EP 2695728 describes a device for automatically cleaning vulcanization moulds using dry ice. The device comprises an annular support bearing two spray nozzles and which is linked by a fixing arm to the chassis of the device. The annular support encloses systems for linearly guiding and translationally displacing the cleaning nozzles according to two orthogonal directions, each nozzle being also displaced in translation by a motorized arm in a direction at right angles to the plane of the first two directions. The annular support is arranged so as to come to face a mould to be cleaned. While it does indeed allow for an automatic cleaning of a vulcanization mould, this device does however present the drawback of being very complex and bulky, which raises problems of cleaning moulds in a press and moulds of small dimensions. In addition, before each cleaning operation, an operator has to bring the device to the mould to be cleaned and centre it correctly relative thereto, which can prove tedious, above all in high temperature conditions, in the presence of vapours or fumes, etc.

SUMMARY

One objective of the invention is to remedy the abovementioned drawbacks and provide a novel solution that makes it possible to improve the ergonomics, the flexibility and the quality of the cleaning of one or more vulcanization moulds for tyres while minimizing the time lost during the operations that are ancillary to the cleaning.

This objective is achieved by the invention, which proposes a method for cleaning a vulcanization mould for tyres in a curing press, using a device comprising a collaborative mobile robot, incorporating a computer program, said robot comprising an autonomous mobile platform mounted on drive wheels and comprising batteries supplying electricity, a dry ice dispenser, sensors for identifying the location of the mould to be cleaned and motors ensuring its displacement between a storage location of the device and the mould to be cleaned and the displacement of an articulated mobile arm of said robot, said arm bearing a nozzle for spraying dry ice from said dispenser, wherein the device comprises means for communication with a control unit for performing the following operations:

- after having received a vulcanization mould cleaning mission instruction and after having checked the level of electrical charge of its batteries and the level of dry ice in a tank of said dispenser, leaving its storage location;
- automatically navigating to the location of the mould to be cleaned;
- automatically scanning the environment in which the curing press comprising the mould to be cleaned, and possibly obstacles, are located;
- automatically identifying the curing press comprising the mould to be cleaned and standing in proximity thereto;
- automatically cleaning the vulcanization mould by directing the arm bearing the spray nozzle, according to a set of instructions, to the interior of the mould so as to clean it with dry ice;
- communicating with the control unit to inform it of the progress of the cleaning operation.

In other words, the method for cryogenic cleaning of a vulcanization mould according to the invention uses an autonomous cleaning device which, when it receives a cleaning mission instruction from a control unit, navigates to the mould to be cleaned and performs an automatic cleaning thereof, without the intervention of an operator. The cleaning is done automatically, by controlling the displacement of the spray nozzle on the basis of the 3D file of the mould to be cleaned or of the dimensions (height, diameter) of the mould or on the basis of the images of the mould transmitted by a camera. The cleaning instructions are pre-programmed or sent by the control unit. The displacement of the spray nozzle is thus adapted to the mould to be cleaned, which allows for accurate trajectories of the spray nozzle. The device performs a cleaning using dry ice sprayed at high speed into a hot mould situated in the curing press, which makes it possible to obtain a rapid and comprehensive cleaning, of high quality, because it makes it possible to detach even the residues placed in spots that are difficult to access or that are poorly lit, or even that are subject to vapour emissions, and do so without posing problems of ergonomics for a user. It makes it possible to obtain a gain in productivity, because the device, when supplied with dry ice and electricity, can string together cleanings without pause.

Preferably, said device communicates with at least one operator.

In a preferred variant embodiment of the invention, the communication between the cleaning device and the operator is bilateral. Thus, the device can commence the cleaning only after having received a cleaning mission instruction transmitted by the operator who accesses the control unit. The operator is of course provided with means for communication with the device (connected watch, tablet, etc.) and can move around in total safety in the workshop after having communicated with the device. In another variant embodiment of the invention, the communication is unilateral, from the device to the operator, which allows the user to be informed of the state of the device or of the progress of the cleaning mission of the device. That allows the operator to move away from the location which is currently being cleaned, which allows him or her to avoid any discomfort linked to the intense noise during the cleaning.

Advantageously, said device communicates with a controller controlling a curing shop in which the curing press comprising the mould to be cleaned is located.

The controller controlling the curing shop is a curing management system, it manages the inputs and outputs of raw tyre blanks and of the tyres cured in the shop and manages the operation of all the curing presses. This controller also counts the number of curings performed by a mould and decides when it must be cleaned. By having it communicate directly with the cleaning device, it is ensured that the mould is cleaned at the right moment, without waiting time, because that can be done even outside of the operators' working hours. It is also possible to have the operator who has checked the cured tyre communicate with the controller controlling the curing shop which sends to the cleaning device a mission instruction to clean the mould which has performed the curing of the checked tyre and on which the operator has detected a defect.

Preferably, the method comprises a step in which the cleaning device circumvents the obstacles identified in its navigation. That allows for a considerable time saving compared the autonomous guided vehicles (AGVs) which stop in front of the obstacle.

Advantageously, after having received the information that the cleaning of the vulcanization mould is finished, the control unit sends a new vulcanization mould cleaning mission instruction to said device. That makes it possible to string together the cleaning operations, for greater efficiency.

Preferably, after having identified the curing press comprising the mould to be cleaned, the device connects to an electricity charging outlet and to a compressed air outlet that are contiguous to the plinth of the curing press. That makes it possible to save the energy stored in its batteries and gives the cleaning device greater autonomy.

Advantageously, the method comprises a step in which said device returns to its storage location as soon as the level of dry ice in the tank has fallen below a predetermined limit. That makes it possible to guarantee the quality of the cleaning. The cleaning process can be resumed as soon as the quantity of ice is sufficient.

Preferably, said device automatically recharges its tank with dry ice. Thus, the device can be directed to the dry ice storage tank and be charged up automatically, which allows for a time saving.

Advantageously, the method comprises a step of blowing or sucking cleaning residues. This makes it possible to rapidly discharge all the cleaning residues and obtain a clean and operational vulcanization mould.

Another subject of the invention is a cleaning device capable of cleaning a tyre vulcanization mould in a curing press comprising:
  a collaborative mobile robot incorporating a computer program, said robot comprising an autonomous mobile platform mounted on drive wheels and comprising batteries supplying electricity;
  a dry ice dispenser linked to a spray nozzle borne by an articulated mobile arm of said robot;
  motors ensuring its displacement between a storage location of the device and the vulcanization mould to be cleaned and the displacement of said articulated arm;
  means for communication with a control unit which transmits to it a vulcanization mould cleaning mission instruction;
  sensors to identify the location of the mould to be cleaned and a control system using a navigation system;
  said control system being linked to said sensors to adjust the position of the device and detect the location of the mould to be cleaned and possibly the objects on its path when it is displaced between a storage location of the device and the location of the mould to be cleaned;
  a digital data storage memory;
  a control module which allows its components to be actuated according to the instruction received from the control unit.

Advantageously, said control module comprises a processor which, when it receives a cleaning mission instruction from said control unit, is programmed to:
  check the level of electrical charge of its batteries and the level of dry ice in its tank,
  allow the device to leave its storage location; and
  automatically navigate to the location of the mould to be cleaned; and
  automatically scan the environment in which the curing press comprising the mould to be cleaned, and possibly obstacles, are located; and
  automatically identify the curing press comprising the mould to be cleaned and stand in proximity thereto; and
  automatically clean the vulcanization mould by directing the arm bearing the spray nozzle, according to a set of instructions, to the interior of the mould so as to clean it with dry ice; and
  communicate with the control unit to inform it of the progress of the cleaning operation.

Preferably, the device comprises means for communication with at least one operator.

Advantageously, the device comprises means for communication with a controller controlling a curing shop in which the curing press comprising the mould to be cleaned is located.

Preferably, the device comprises navigation means allowing it to avoid obstacles.

Advantageously, the device comprises means for identifying its location with respect to the curing press comprising the mould to be cleaned and means for connecting to an electricity charging outlet and to a compressed air outlet that are contiguous to the plinth of the press.

Preferably, the device comprises sensors for measuring the level of dry ice in the tank which are linked to said control system, which sends an instruction to the control module to return the device to its storage location as soon as the level of dry ice in the tank has fallen below a predetermined limit.

Advantageously, the device comprises means for blowing or sucking cleaning residues.

BRIEF DESCRIPTION OF THE FIGURES

The invention will be better understood from the rest of the description, which is based on the following figures.

In the different figures, elements that are identical or similar bear the same reference. Their description is not therefore systematically repeated.

DETAILED DESCRIPTION

Figure 1:
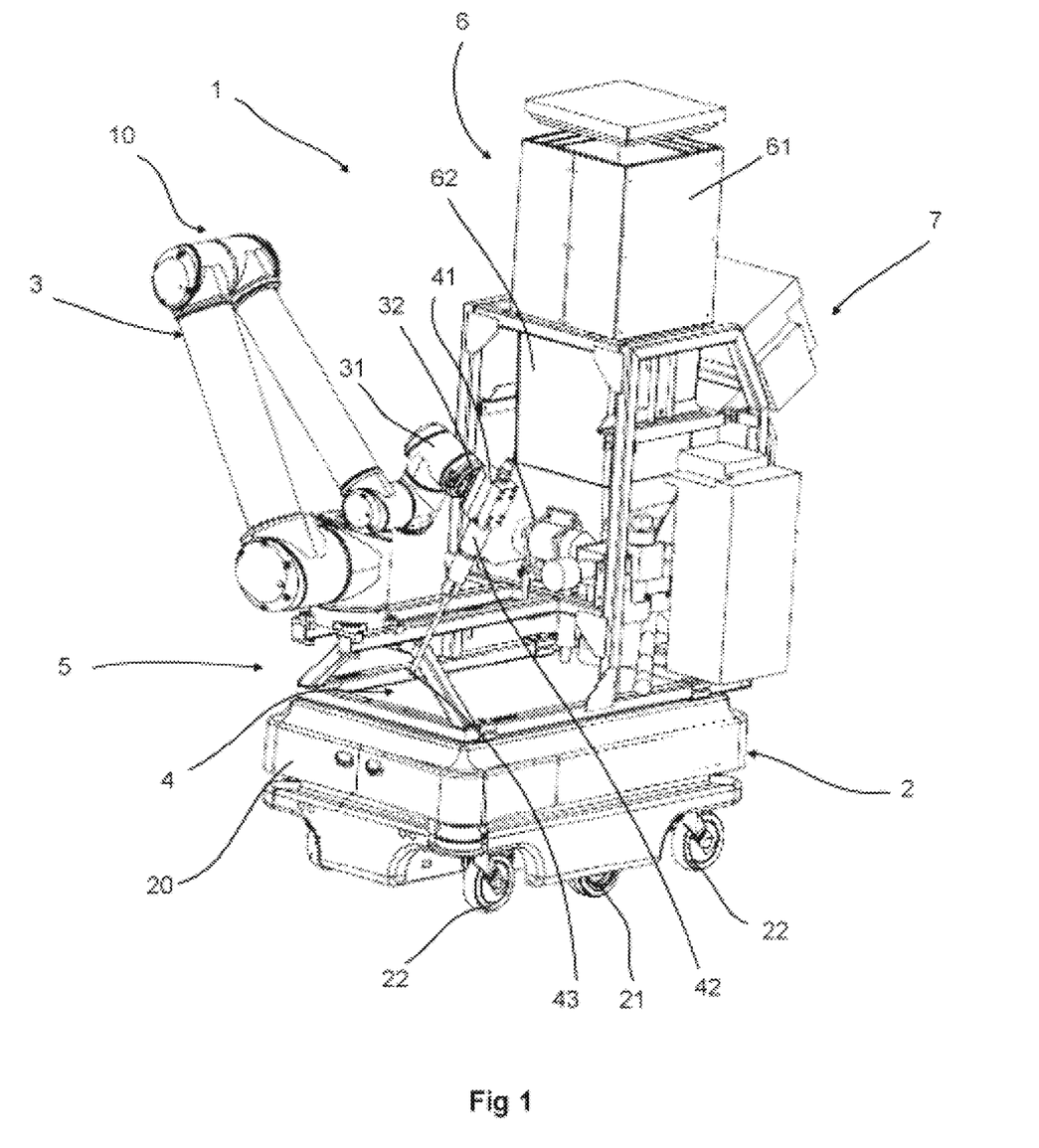
FIG. 1 is a perspective view of a cleaning device of the invention.

FIG. 1 illustrates a cleaning device 1 capable of cleaning vulcanization moulds for tyres according to the invention. The device 1 comprises a collaborative mobile robot 10 comprising an autonomous mobile platform 2 on which is mounted an articulated arm 3 which bears a spray nozzle 4 linked to a dry ice dispenser and which moves around with the platform. The autonomous mobile platform 2 comprises a chassis 20 of generally rectangular form. The chassis is supported by two pairs of front and rear wheels 22, mounted to rotate freely, and it is displaced by two differential wheels 21, each being driven in rotation by an electric motor. The autonomous mobile platform 20 also incorporates electrical supply batteries (not represented in the drawings). The autonomous mobile platform 2 also comprises sensors for scanning and identifying the environment, a microprocessor control device and means for communicating wirelessly, for example by WiFi with a remote control unit. Such an autonomous mobile platform is for example of the MiR 200™ type offered by Mobile Industrial Robots ApS. It can carry up to 200 kg of load, it comprises multiple (ultrasound and laser) sensors and a 3D camera that are incorporated and linked to the microprocessor control unit of the platform. The autonomous mobile platform 20 can thus scan its environment, it identifies obstacles or people, that it manages to avoid, while calculating the most efficient path to get to its destination. The control device of the platform is linked to the embedded control system of the cleaning device, for example by a link of ethernet type.

The articulated arm 3 is a collaborative robot arm which is mounted on the autonomous mobile platform 2, from which it receives power supply and commands in operation. It goes without saying that the platform incorporates proximity sensors which detect the approach of an operator or of an object. The robot is of the collaborative type and comprises force sensors which act on the collaborative robot accordingly in a manner that is generally known, notably from the document U.S. Pat. No. 9,669,548. The force sensors of the collaborative robot act when the autonomous platform is stopped. The articulated arm 3 is of the collaborative robot type with six axes of rotation and comprises several arm sections that are articulated relative to one another. The last section 31 of the articulated arm 3 comprises an effector 32 which holds the body 41 of a spray nozzle 4 so that the nozzle is displaced with the arm.

The body 41 of the spray nozzle 4 is extended by a wand 43. The wand 43 is covered by a sleeve 42 made of a material which has good thermal insulation properties, such as insulating wool, expanded polystyrene, etc. The spray nozzle is connected using a flexible pipe (not illustrated in the drawings) to a dry ice dispenser, as will be explained hereinbelow.

Figure 2:
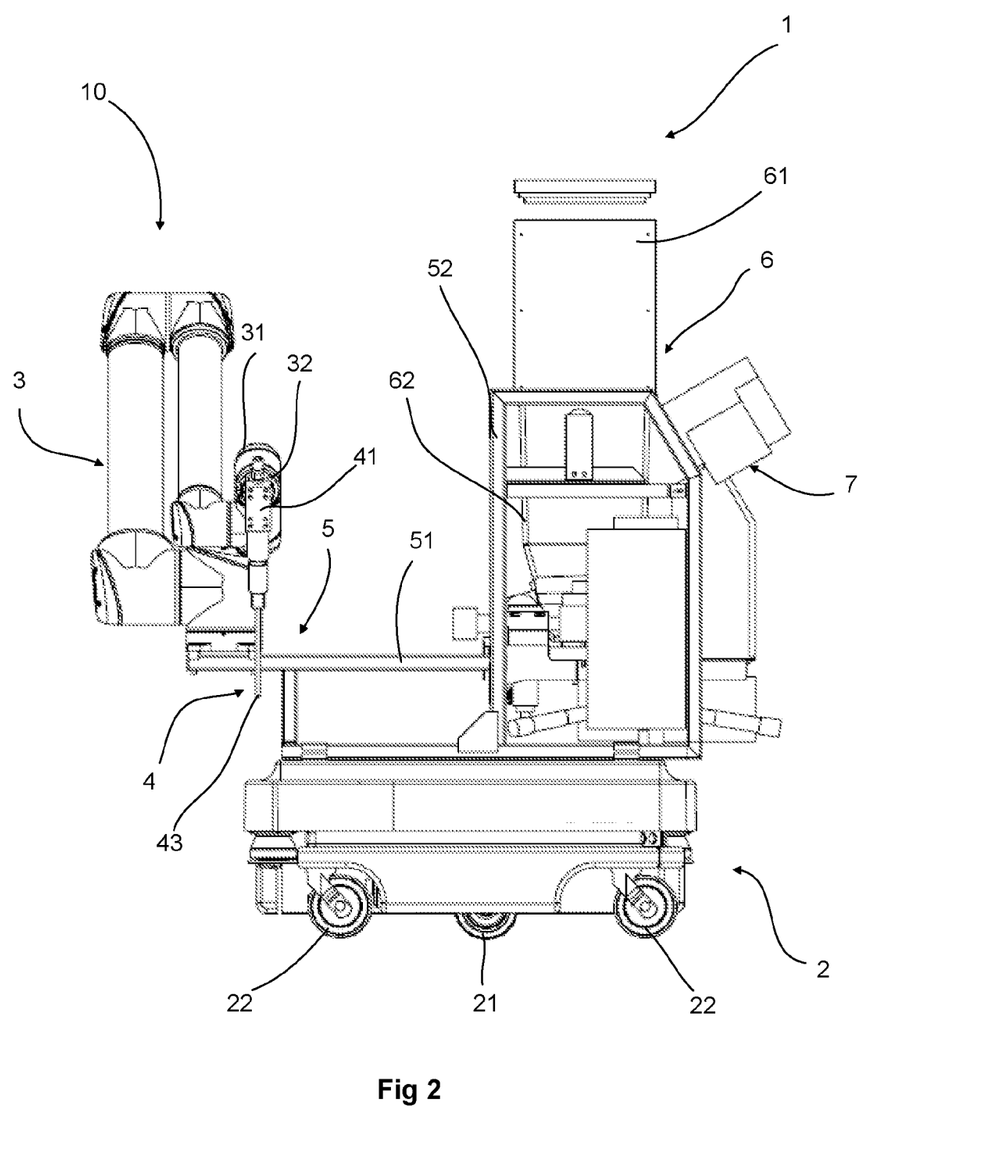
FIG. 2 is a side view of the device of FIG. 1.

As can be seen better in FIGS. 1 and 2, a frame 5 is fixedly mounted on the top face of the autonomous mobile platform 2. The frame 5 is of metal and forms a supporting structure for certain components of the vulcanization mould cleaning device. The frame 5 comprises a first part 51 supporting the articulated arm 3 and a second part 52 forming a support for other components of the device. The articulated arm 3 is mounted at the front end of the part 51 of the frame 5 by being raised and remotely sited relative to the front end of the mobile platform 2 so as to be able to more easily access the interior of the mould to be cleaned.

The second part 52 of the frame 5 supports a dry ice dispenser 6 and an embedded control system 7. The dry ice dispenser 6 comprises a tank 61 which contains pellets of dry ice at a temperature of approximately −78° C. The dry ice pellets have a cylindrical form with a diameter of approximately 2 to 3 mm for a height of a few mm. In a variant, microcrystals of dry ice can be used. The pellets or microcrystals of dry ice pass from the tank 61 into a dispensing chamber 62 from which they are sprayed at approximately 300 m/s onto the surface to be cleaned using compressed air. The compressed air at a pressure lying between 1 and 15 bar arrives in the chamber 62 from the compressed air network of the curing shop or from a compressor borne by the autonomous mobile platform 2. In a variant, the chamber 62 is linked to a fan borne by the autonomous platform. The entry into the chamber 62 is provided with a solenoid valve (not illustrated in the drawings) which is controlled by the control system 7 of the device. The tank 61, the chamber 62 and the pipes for transferring dry ice to the spray nozzle 4 are covered with thermal insulating materials.

The control system 7 of the cleaning device is linked to the control device of the autonomous platform 2, which uses an embedded navigation system. The device comprises, in its memory, a map of the workshop (which can be plotted by the device or downloaded from a digital medium) and is capable of steering and navigating (it calculates its path based on the point of departure, the point of arrival and the obstacles encountered) by using algorithms of SLAM (Simultaneous Localisation And Mapping) type.

Figure 4:
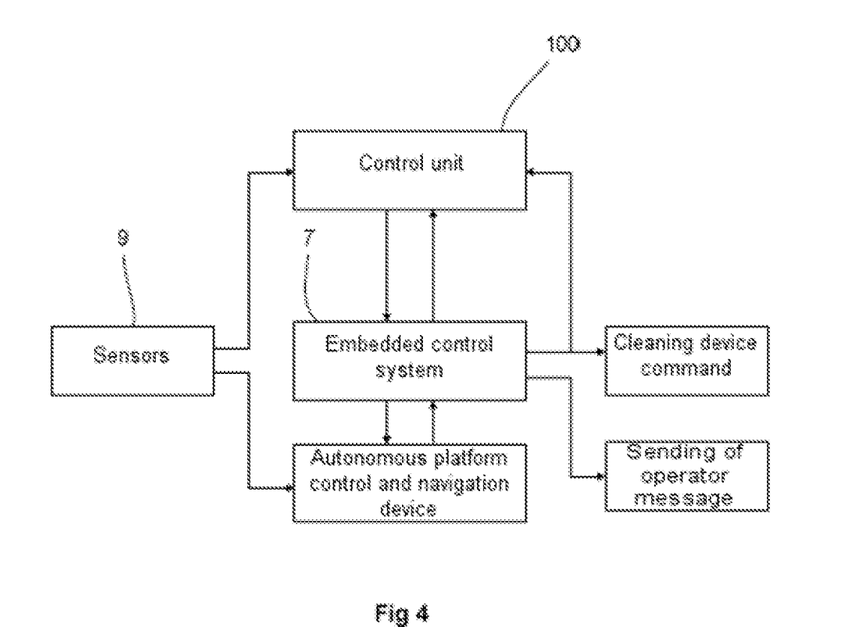
FIG. 4 is a functional block diagram of the cleaning device.

As illustrated in FIG. 4, the control system 7 is linked to the control and navigation device of the autonomous platform 2, which receives the information from the sensors of the device to identify the location of the mould to be cleaned. The control and navigation device is linked to said sensors to adjust the position of the device and detect the location of the mould to be cleaned and possibly the objects to be avoided on its path when it moves between a storage location of the device and the location of the mould to be cleaned. The device also comprises means for communicating wirelessly, for example by WiFi, with a remote control unit 100 which acts as supervisor for operation of the device, a unit which transmits to it a vulcanization mould cleaning mission instruction. The embedded control system 7 is of microprocessor computer type, therefore comprising one or more CPU processor units and RAM and ROM memories. The device also comprises a command module which allows its components to be actuated according to the instruction received from the control unit 100 via the control system 7.

The cleaning device also comprises a module for communication of GSM type with at least one operator. Each operator is provided with a receiver device of connected watch, tablet or smartphone type. Thus, the operator who is in the curing shop thus receives a message from the device, which is in the process of performing its vulcanization mould cleaning mission and is alerted to the operation in progress in order to be able to take appropriate measures (move away to avoid the noise, leave the workshop, etc.).

When it is not engaged in a vulcanization mould cleaning mission, the cleaning device stands in a storage location in which it is connected to an electrical recharging terminal (not illustrated in the drawings). The storage location is provided with means for supplying dry ice from a storage tank or from a dry ice production machine.

When it is engaged in a cleaning mission, the device 1 navigates to the location of the curing press comprising the vulcanization mould to be cleaned and it stands alongside the latter. The plinth of the curing press is provided with an electricity and compressed air supply terminal 8. The supply terminal 8 can be seen better in FIG. 3. It comprises a marker 81 which is a shape recognition marker, the form of the marker having been previously stored in the memory of the cleaning device. The terminal 8 also comprises a compressed air supply outlet 82 and an electricity supply outlet 83. The compressed air connection is made via a rapid pneumatic coupling with instantaneous connection of the type marketed by the company PARKER HANNIFIN. The electricity connection is made using a rapid coupling of the SELFPLUG® magnetic coupling type from the company GULPLUG. In operation, the device 1 comes to stand in front of the marker 81, which ensures the accurate positioning of the corresponding outlet for coupling its compressed air connection pipe to the compressed air outlet 82 and its respective electrical connector to the electricity supply outlet 83.

Figure 3:
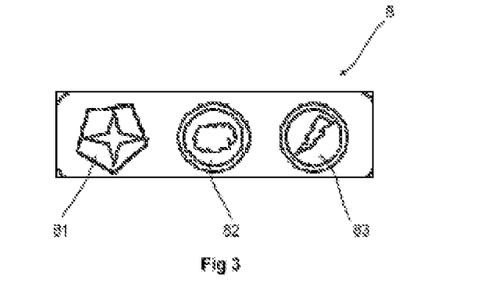
FIG. 3 schematically illustrates the connection panel of the cleaning device during the cleaning operation.

In a variant, the cleaning device comprises an embedded compressor and carries sufficient electrical energy in its batteries not to need to be connected to the terminal 8.

In operation, the cleaning device directs the spray nozzle 4 to the interior of the mould to be cleaned in accordance with the instructions received from its control system 7. The dry ice sprayed under pressure against the hot parts of the vulcanization mould to be cleaned provokes, on the one hand, a mechanical shock, through the high speed impact of the ice particles against the walls of the mould and, on the other hand, a thermal shock, through the temperature difference (approximately 170° C. for the hot mould and approximately −78° C. for the dry ice). As a result of the cumulative effects of the mechanical shock and of the thermal shock, the moulding residues detach from the wall of the mould. In addition, the dry ice goes directly from the solid state to the gaseous state, its volume is significantly increased (approximately 800 times), which drives with it a part of the cleaning residues. At the end of the cleaning, the solenoid valve, which allows the dry ice to access the chamber 62, is closed and the nozzle 4 sends compressed air to the mould, which makes it possible to discharge the cleaning residues. In a variant, the arrival of compressed air in the chamber 62 is blocked and the chamber is then connected with a fan which allows suction via the nozzle 4 (the dry ice still being prevented from accessing the chamber by the solenoid valve). The suction action of the fan of the device allows the cleaning residues to be sucked via the nozzle 4 into the chamber 62, which communicates for this purpose with an ancillary storage tank via a non-return valve (not illustrated in the drawings).

Figure 5:
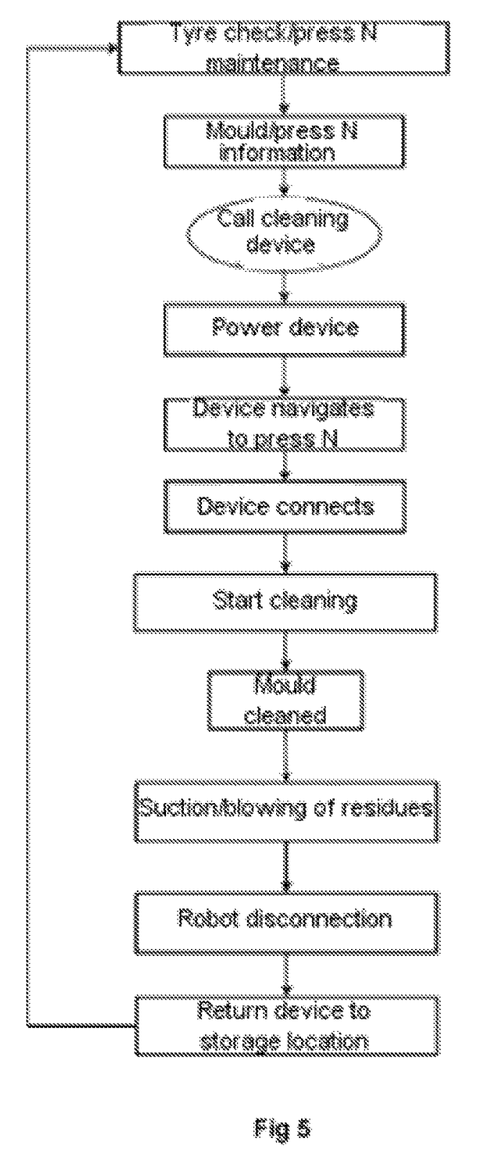
FIG. 5 is an operating diagram of the cleaning device according to a first embodiment of the invention.

FIG. 5 is a block diagram which illustrates the main steps of the vulcanization mould cleaning operation according to a first embodiment. The cleaning device thus communicates with the control unit of the workshop and performs the operation automatically according to the steps indicated in FIG. 5. This is a fully automatic cleaning operation.

More particularly and as can be seen in this figure, the cleaning of the vulcanization mould is decided on after the checking of the cured tyre and for the purpose of preventive maintenance requested by the controller controlling the curing shop. The information is transmitted to the control or supervision unit, in this case the controller controlling the curing shop, which calls the cleaning device to perform a vulcanization mould cleaning mission. The device checks the level of dry ice in its tank and the level of charge of its batteries and, if necessary, it recharges, then it leaves the storage location. The device is displaced autonomously to the press "N" to be cleaned for which it has received the cleaning mission instruction. The device knows the location of the press and calculates its optimum path to get to it in autonomous navigation mode. Having arrived in front of the press, the device connects for compressed air and electricity to the supply terminal provided for that purpose at the foot of the press. Once connected, the device launches the cleaning operation according to a preestablished program and according to data received from the central unit. The mould is thus cleaned, the residues being removed in a blowing or sucking operation performed by the cleaning device. The collaborative mobile robot is then automatically disconnected by the device. The cleaning device returns to its storage location in autonomous navigation mode and awaits a new instruction.

Figure 6:
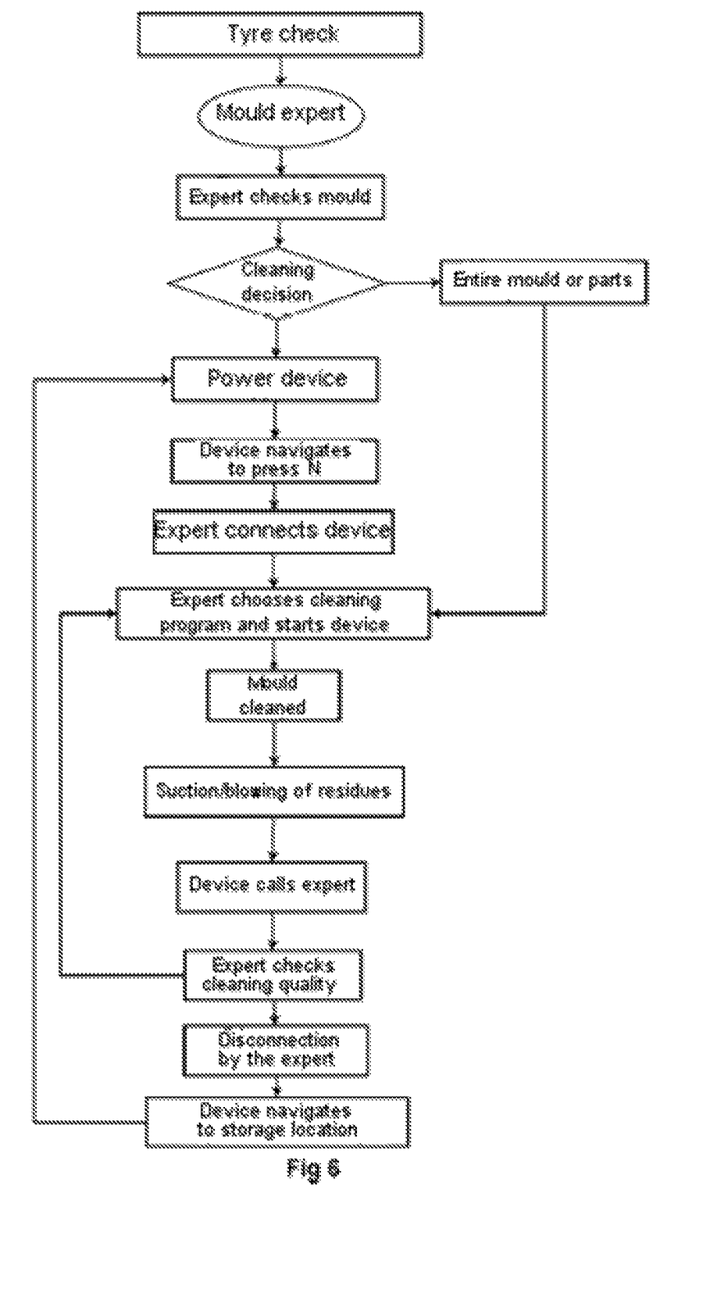
FIG. 6 is an operating diagram of the cleaning device according to a second embodiment of the invention.

FIG. 6 is a block diagram which represents the steps of the vulcanization mould cleaning operation according to a second embodiment. The starting point is the step of inspection of the cured tyre, but the order is given this time by an operator, who is the vulcanization mould expert, and who transmits his or her instructions via an interface of the control unit of the device. The cleaning device is displaced autonomously and performs the cleaning automatically, but it communicates with the operator, who intervenes at certain steps before transmitting an instruction to the device. This is a semi-automatic cleaning operation.

More particularly, and as can be seen in this figure, once the cured tyre has been checked, the vulcanization mould expert is called to check the mould which has performed the curing of the checked tyre and decides to perform a cleaning operation on the mould, either entirely, or only on a part or zone which has produced defects on the tyre. The expert then sends a cleaning mission instruction to the device. As in the mode previously described, the device checks the level of dry ice in its tank and the level of charge in its batteries and, if necessary, it recharges, then it leaves the storage location. The device is displaced autonomously to the press to be cleaned "N" for which it has received the cleaning mission instruction. The device knows the location of the press and calculates its optimum path to get there in autonomous navigation mode. Having arrived in front of the press, the device stops and the operator connects it for compressed air and electricity to the supply terminal provided for this purpose at the foot of the press. After connection, the expert sends the device an instruction to perform a cleaning program that he or she has chosen after having performed the inspection of the mould. The device performs the cleaning operation. Once the mould has thus been cleaned, the residues are removed by a blowing or sucking operation performed by the cleaning device. The device communicates with the expert to inform him or her of the end of the cleaning. The expert checks the quality of the cleaning performed and disconnects the collaborative mobile robot. The device then returns to its storage location in autonomous navigation mode and awaits a new instruction.

Other variants and embodiments of the invention can be envisaged without departing from the scope of its claims.

Thus, instead of an autonomous platform guided using its sensors and a map based on algorithms of SLAM type, it is possible to use an autonomous guided vehicle, known by the acronym AGV, which navigates by following, for example, a magnetic rail or using a radar. Quite apart from the navigation system, which is different, such a cleaning device comprising an autonomous guided vehicle comprises the same components as that previously described.

It is also possible to provide for the cleaning device to return to its storage location as soon as the control system detects a malfunction of one of its components.

The invention claimed is:

1. A method for cleaning a vulcanization mold for tires in a curing press using a cleaning device including a collaborative mobile robot, a dry ice dispenser, an articulated mobile arm bearing a spray nozzle for spraying dry ice from the dispenser, sensors for identifying a location of a mold to be cleaned, motors ensuring the displacement of the mobile robot between a storage location of the cleaning device and the mold to be cleaned and the displacement of the articulated mobile arm, and a means for communication with a control unit, the collaborative mobile robot incorporating a computer program, including an autonomous mobile platform mounted on drive wheels, and including batteries supplying electricity, and the method comprising:
receiving a mission instruction to clean the vulcanization mold;
checking a level of electrical charge of the batteries and a level of dry ice in a tank of the dispenser;
leaving the storage location after having received the mission instruction to clean the vulcanization mold and after having checked a level of electrical charge of the batteries and a level of dry ice in a tank of the dispenser;
automatically navigating to the location of the mold to be cleaned;
automatically scanning an environment in which the curing press comprising the mold to be cleaned and possible obstacles are located;
automatically identifying the curing press comprising the mold to be cleaned and standing in proximity thereto;
automatically cleaning the vulcanization mold by directing the arm bearing the spray nozzle, according to a set of instructions, to an interior of the mold so as to clean it with dry ice; and
communicating with the control unit to inform of the progress of the cleaning operation.

2. The method according to claim 1, wherein the cleaning device communicates with at least one operator.

3. The method according to claim 1, wherein the cleaning device communicates with a controller controlling a curing shop in which the curing press comprising the mold to be cleaned is located.

4. The method according to claim 1, wherein the cleaning device circumvents the possible obstacles.

5. The method according to claim 1, wherein, after having received information that the cleaning of the vulcanization mold is finished, the control unit sends a new vulcanization mold cleaning mission instruction to the cleaning device.

6. The method according to claim 1, wherein, after having identified the curing press comprising the mold to be cleaned, the cleaning device connects to an electrical charging outlet and to a compressed air outlet that are contiguous to a plinth of the curing press.

7. The method according to claim 1, wherein the cleaning device returns to the storage location as soon as a level of dry ice in the tank falls below a predetermined limit.

8. The method according to claim 1, wherein the cleaning device automatically recharges the tank with dry ice.

9. The method according to claim 1, further comprising a step of blowing or sucking cleaning residues.

10. A cleaning device configured to clean a tire vulcanization mold in a curing press, the cleaning device comprising:
a collaborative mobile robot incorporating a computer program, the mobile robot including an autonomous mobile platform mounted on drive wheels, and comprising batteries supplying electricity;
a dry ice dispenser including a tank for holding dry ice;
an articulated mobile arm bearing a spray nozzle linked to the dry ice dispenser for spraying dry ice from the dispenser;
motors ensuring displacement of the mobile robot between a storage location of the cleaning device and a vulcanization mold to be cleaned and displacement of the articulated arm;
means for communication with a control unit, the cleaning device configured to receive a vulcanization mold cleaning mission instruction from the control unit via the means for communication and transmit the progress of the cleaning operation to the control unit via the means for communication;
sensors for identifying a location of the mold to be cleaned;
a control system having a navigation system and being linked to the sensors to adjust a position of the cleaning device and detect the location of the mold to be cleaned and possibly objects in a path of the cleaning device when the cleaning device moves between the storage location of the cleaning device and the location of the mold to be cleaned;
a digital data storage memory; and
a control module, components of which are actuated according to the vulcanization mold cleaning mission instruction received from the control unit.

11. The cleaning device according to claim 10, wherein the control module comprises a processor which, when it receives a cleaning mission instruction from the control unit, is programmed to:
- check a level of electrical charge of the batteries and a level of dry ice in the tank;
- allow the cleaning device to leave the storage location;
- automatically navigate to the location of the mold to be cleaned;
- automatically scan an environment in which the curing press comprising the mold to be cleaned and possible obstacles are located;
- automatically identify the curing press comprising the mold to be cleaned and stand in proximity thereto;
- automatically clean the vulcanization mold by directing the arm bearing the spray nozzle, according to a set of instructions, to an interior of the mold so as to clean it with dry ice; and
- communicate with the control unit to inform of the progress of the cleaning operation.

12. The cleaning device according to claim 10 further comprising means for communication with at least one operator.

13. The cleaning device according to claim 10, further comprising means for communication with a controller controlling a curing shop in which the curing press comprising the mold to be cleaned is located.

14. The cleaning device according to claim 10, further comprising navigation means allowing the cleaning device to avoid obstacles.

15. The cleaning device according to claim 10, further comprising means for identifying location with respect to the curing press comprising the mold to be cleaned and means for connecting to an electrical charging outlet and a compressed air outlet that are contiguous to a plinth of the curing press.

16. The cleaning device according to claim 10, further comprising sensors for measuring a level of dry ice in the tank, the sensors being linked to the control system, which sends an instruction to the control module to return the cleaning device to the storage location as soon as the level of dry ice in the tank falls below a predetermined limit.

17. The cleaning device according to claim 10, further comprising means for blowing or sucking cleaning residues.

* * * * *